2,766,453

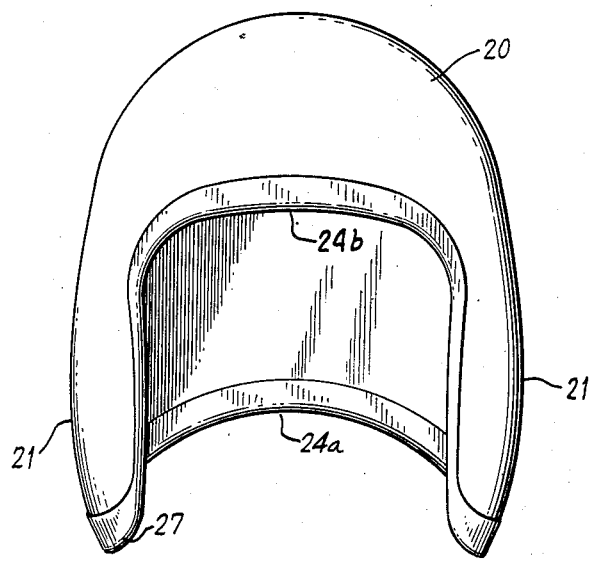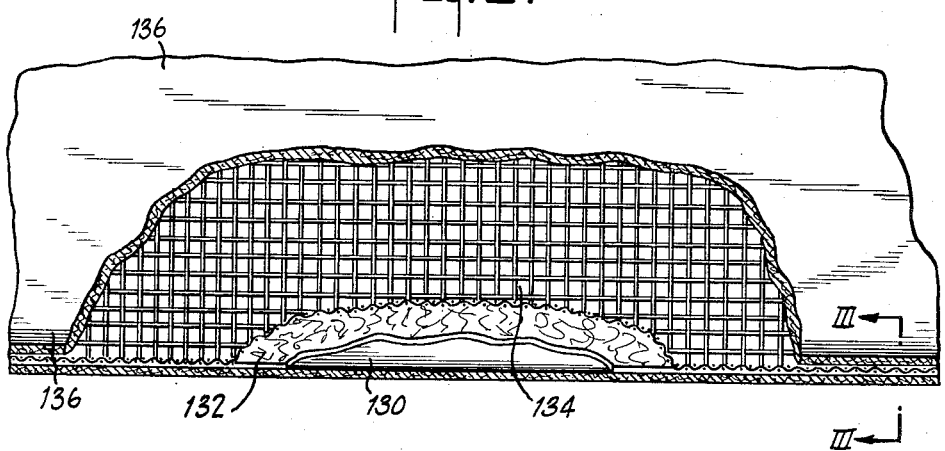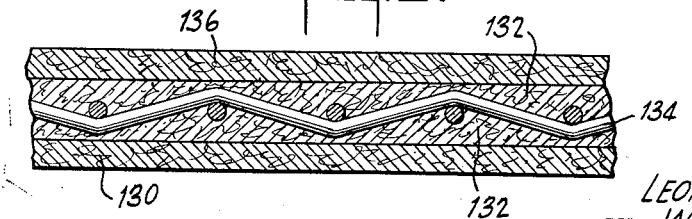
INVENTORS
LEONARD P. FRIEDER
WALTER S. FINKEN
ATTORNEY United States Patent Office 2,766,453
Patented Oct. 16, 1956

PLASTIC IMPREGNATED FABRIC MATERIAL AND METHOD FOR MAKING SAME

Leonard P. Frieder, Great Neck, and Walter S. Finken, Brooklyn, N. Y.; said Finken assignor to said Frieder Original application December 21, 1950, Serial No. 201,904, now Patent No. 2,739,309, dated March 27, 1956. Divided and this application March 25, 1954, Serial No. 418,585

1 Claim. (Cl. 2—3)

This application is a division of our copending application Serial No. 201,904, filed December 21, 1950, for Headgear Structure, now Patent No. 2,739,309, dated March 27, 1956.

This invention relates to impact resisting materials, such as are used for the construction of protective helmets and the like, to protect the wearer against heavy blows and impacts and to avoid penetration of impinging objects.

While the materials of the character disclosed herein may be used for a wide variety of purposes, a particularly important application of the invention is in helmets designed for aviators and the like, where the circumstances of the wearer may subject him to severe blows about the head. For example, in high speed aircraft, rapid turns, dives and other usual or unusual operations often throw the pilot or passenger against adjacent structural parts of the aircraft with considerable force; in consequence a protective helmet is practically a necessity for personnel under such conditions, to protect the skull from injury. Since the helmet must often be worn for long periods of time, it should be as light in weight and as comfortable as possible. Indeed lightness of weight is a particularly important feature, since the same accelerations and decelerations which tend to throw the wearer's head about will likewise tend to displace a heavy helmet relative to his head, putting extra pressures on his head in an uncomfortable and tiring manner even without impact of external objects.

A primary object of the present invention is to provide an improved impact resisting material. A further object is to provide such a material which is capable of being formed into a shell structure for a protective helmet.

Another object is to provide a helmet structure having an improved, light but exceptionally strong shell, as of composite fibrous and plastic material, strongly resistant to shattering or fracture. A more specific object is to provide an improved structural sheet or plate-like material, adapted for embodiment in helmet shells or other vessels, containers or walls, which is light in weight, durable, and characterized by the strength of fibrously bonded plastic composition, while highly resistant to cracking or breaking and specifically free of any grain or lines of ready cleavage. A still further object is to provide such structure or structural material, peculiarly suited for helmet shells as well as for other uses, which may be integrally arranged to have different values of weight and strength at various selected localities.

The foregoing and other objects of the invention are attained by providing a laminated structure, including outer layers of thickly felted material and an inner layer of fluffed fibrous, felted mat in contact with an open weave fabric sheet so that the fluffed fibrous material works through the openings in the woven sheet. All the layers are impregnated with plastic material in liquid form by known procedures and the plastic material is then cured by suitable heat and pressure treatment.

Other objects and advantages of the invention will become apparent from a consideration of the following specification, claim and drawing.

In the drawing:

Fig. 1 is a front elevational view of the helmet shell constructed of material embodying the invention;

Fig. 2 is an enlarged view of a portion of the helmet shell body, with successive layers or parts of the constituent materials broken away to illustrate the method of lamination or assembly of those materials; and Fig. 3 is greatly enlarged sectional view taken on the line III—III of Fig. 2 showing the structure of the shell in cross-section.

Referring to Fig. 1, there is shown a shell 20 for a protective helmet. The shell 20 includes rigid depending flaps 21 at the sides which are somewhat bulged out for accommodation of earphones or similar instruments. The bottom edge of the helmet is lower at the rear 24a than at the front 24b, thereby providing a skirt-like portion to protect the base of the wearer's skull. The entire lower edge of the helmet may be embedded in a protective head of rubber or other similar resilient material.

The helmet shell 20 itself, for example as shown in Fig. 1, is preferably constructed of an essentially rigid but very tough and strong material having a constitution such as illustrated in Figs. 2 and 3. This material is constructed of a plurality of sheets, originally highly flexible, which are superposed in layers and impregnated with an appropriate composition or the like, as will now be described.

Thus in manufacturing the plate-like composition, a layer 130 of preformed, felted material is first provided. On it is disposed a fluffed, fibrous, felted mat 132 of high permeability overlaid by a fabric 134 of very open weave, the opposite side of the composite structure being completed by a further layer 136 of felted, fibrous material which may be similar to the layer 130. The sheets or mats 130, 136 are each a relatively thin felted material consisting of irregularly laid fibers appropriately intermeshed but only very slightly bonded (by adhesive material or the like), so that such mat constitutes a thin, highly flexible and highly porous felt, the fibers being most advantageously glass fiber, or alternatively asbestos, mineral wool, or synthetic substances such as rayon or nylon, or even cotton, wool or other natural fibers.

The layer or mass 132 consists of a slightly felted mat of relatively loose fibers which have been fluffed up and which are essentially not bonded together, except by their mutual interlacing. The woven net or fabric 134, which may have a mesh as large as $\frac{1}{16}$ inch or so, is a reasonably strong but highly porous sheet. The fibrous composition of both the fluffed mass 132 and the woven fabric 134 is of suitable nature, such as the materials named above for the mat layers 130, 136. As stated, the layers 130, 136 are prefelted, rolled mats, i. e. thin felted sheets which have been passed between rolls but which are nevertheless highly porous.

In preparing the assembly to constitute an essentially monolithic sheet or plate-like material, the woven reinforcement 134 and fluffed layer 132 are assembled together, as on a suitable flat surface or on a contoured form, and are impregnated with a bonding fluid, i. e. preferably to the point of at least as much as these materials will hold. The assembly of layers 132, 134 is then covered on opposite sides by the mats 130, 136; indeed if desired, the materials 132, 134 may be laid on one or the other of the mats 130, 136 before the bonding fluid is applied to the inside materials 132, 134.

After the second of the mats 130, 136 has been disposed in place, the entire assembly is subjected to considerable pressure, for example by holding it between congruent male and female dies or like surfaces which have the shape of the helmet shell, such dies being brought and maintained together with substantial pressure while the bonding fluid solidifies or dries or otherwise sets to at least a sufficient extent to maintain the integrity of the assembly when the dies are removed. Pressing the outer layers together against the impregnated central layers 132, 134 in this fashion not only causes the fluffed fibers of the layers 132 to become intertwined with the fabric 134, as apparent in Fig. 3, but also forces out any air that may be trapped in these layers, and finally causes the bonding fluid to flow into the outermost layers 130, 136, filling the voids in the latter.

While the operation has been described as involving the assembly of the woven fabric 134 over the fluffed material 132, it will be understood that the fluffed material may alternatively be placed over the woven fabric, or the latter may be disposed between two like, thinner layers of the fluffed material. In any case, the purpose and result of the arrangement is that the fibers 132 tend to pass through the interstices of the fabric 134, filling them and providing an essentially continuous fiber mass which is reinforced by the woven net or textile 134 but which has a substantial fibrous structure in and around all of the openings of the fabric 134.

The bonding fluid not only permeates all of the composite inner fibrous mass constituted by the elements 132 and 134, but also the outer layers 130 and 136 so that a single, unified or essentially monolithic structure is provided. After the pressing operation has been completed and the bonding fluid has dried or set to a solid state, the assembly becomes an essential rigid but remarkably strong, plate-like structure. A particular feature of the arrangement is that unlike shell materials made by plastic impregnation of close-woven fabric bases, the complete structure has no linear grain or other predetermined lines of cracking or cleavage, yet is fully as tough and durable by reason of the reinforcement of the fabric 134 as well as by the intermeshed nature of the other fibrous materials, particularly the fluffed fibers 132 traversing the openings of the material 134.

The bonding medium may alternatively be applied after all layers have been assembled, although the insertion of such material at least prior to addition of the outermost or uppermost layer is believed desirable for maximum insurance against entrapment of air. The bonding medium employed may be any of various plastic or like compositions, either of thermoplastic or thermosetting type, or of the type which can be liquefied by solution in a volatile liquid. Low pressure molding compositions have been found especially suitable. For instance, excellent products have been obtained with polyester resins, compounded and molded in known ways suitable to yield tough, rigid (or for some purposes very slightly or rigidly resilient) bodies having good dimensional stability. Examples of these thermosetting substances are the so-called polyester Selectrons (made by Pittsburgh Plate Glass); thus a mixture of 49% of each Polyester Selectrons 5003 and 5208 with 2% of an organic peroxide material such as Luperco ATC (made by Novadel-Agene) has yielded satisfactory hardcrowned helmet shells. Variations in hardness or flexibility (e. g. when the cheek or ear flaps are to be more or less flexible than the crown) are obtainable by suitable variation in proportions. Another kind of plastic substance especially useful for helmet shells of the impregnated fibrous-base type comprises phenolic compositions, for example various known low pressure molding materials of such composition. As stated, the fibers of the various layers can be of various substances, glass fiber being at present preferred, but other natural or synthetic fibers being also useful, including asbestos, mineral wool, wood fibers as well as others mentioned above. The fibers for the several layers may be all alike or may be of mutually different substances, it now being understood that the nature of the bonding medium as well as the fibers can be selected to suit the circumstances under which the ultimate structure is to give service.

While the composite material, thus composed of interbonded fiber layers permeated with a solidified plastic substance so as to constitute an essentially smooth-surfaced sheet, has been described as for construction of the helmet shell 20, this type of sheet or plate-like material may be used for the manufacture of other devices, such as boxes, containers or the like or may be used in panels or other shapes as parts of objects to be assembled. The procedure and product are conveniently adapted for manufacture by a pre-mold operation, e. g. as between dies mutually shaped to fit the configuration of the desired helmet shell or other structure. Alternately, if the material is made for sheets or panels, the bonding and pressing operations may be effected by passing it between rolls or the like.

It will now be seen that the resulting article, for example the helmet shell 20, is rigid, tough and remarkably durable. Furthermore, it has no grain in any predetermined direction and consequently has no tendency to crack or split along predetermined thread lines or the like, as characterizes ordinary impregnated fabrics when struck by a sharp, heavy blow. The resistance to penetration on impact has been found to be very high, as likewise the resistance to chipping, cracking, appreciable bending or the like.

The thickness, weight and rigidity of the plate-like composition can be varied by altering the number or the thickness of the layers or plies. For example, the open weave fabric 134, or some of the soft, fluffed fibers of the mat 132, or both, can be omitted at the rear flaps 121 of the helmet so as to make these flaps more flexible in the finished state.

We claim:

A method of making a plate-like article, comprising assembling a woven textile reinforcing layer having substantial strength in face-to-face contact with a slightly felted mat layer of relatively loose, fluffed glass fibers, said woven layer having meshes at least of the order of one-sixteenth inch across so that said fluffed fibers tend to penetrate said meshes, fastening the layers together only by compressing the assembly to intertwine the fluffed fibers with the open-weave textile, impregnating the assembly of layers with plastic bonding material, and solidifying the plastic bonding material so that the structure comprises an essentially integral plate-like article permeated throughout with said plastic bonding material.

References Cited in the file of this patent

UNITED STATES PATENTS

| 1,318,742 | Frederick | Oct. 14, 1919 |
| --- | --- | --- |
| 2,295,855 | Ludwell | Sept. 15, 1942 |
| 2,312,227 | Yant | Feb. 23, 1943 |
| 2,428,654 | Collins | Oct. 7, 1947 |
| 2,495,640 | Muskat | Jan. 24, 1950 |
| 2,543,101 | Francis | Feb. 21, 1951 |
| 2,577,205 | Meyer et al. | Dec. 4, 1951 |